Jan. 15, 1963
F. J. CIRVES ET AL
3,073,544
COILABLE MEASURING RULER
Filed Nov. 1, 1961
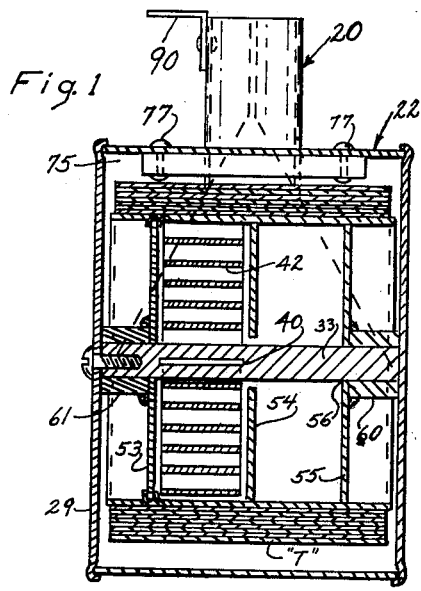
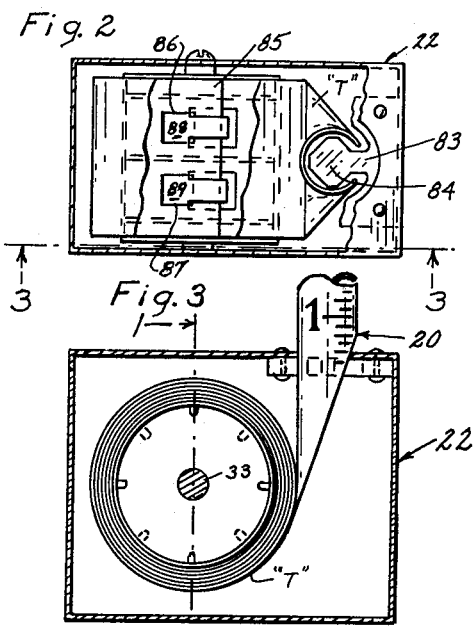
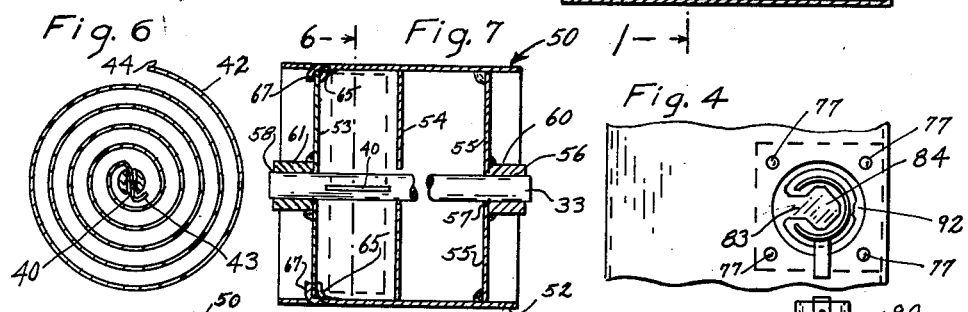
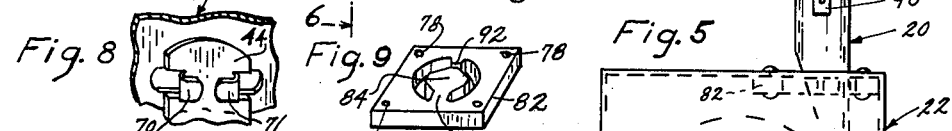
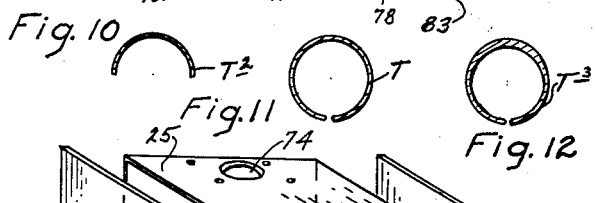
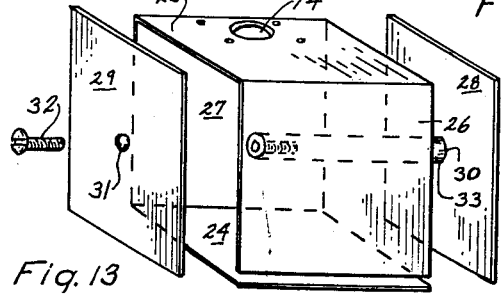
INVENTORS:
Francis J. Cirves
Myron A. Marsh

United States Patent Office 3,073,544
Patented Jan. 15, 1963

3,073,544
COILABLE MEASURING RULER
Francis J. Cirves, 1232 N. Linden Ave., Palatine, Chicago, Ill., and Myron A. Marsh, R.F.D. 1, Box 79, Union City, Ind.
Filed Nov. 1, 1961, Ser. No. 154,920
3 Claims. (Cl. 242—107)

This invention relates to coilable measuring rulers of the type which includes a measuring tape adapted to be coiled within a suitable casing or holder.

Coiled steel rulers and tape measures are well known. In the past they have taken various forms, sometimes depending wholly upon a coiled wind-up spring, and in other instances they have been so associated with a case as to use no spring characteristics other than that of their own inherent resilience. These constructions have evinced various disadvantages.

The improvements of the present invention have particular application in connection with a measuring tape having a bent transverse form, such as a concavo-convex form, so that the tape has an inherent tendency to resist bending. In the present instance, a drum and resilient winding means are provided for aiding the measuring tape into coils within the casing, and this combined drum and resilient means has a tension which only substantially counterbalances the resistance of friction of the parts and the tendency of the measuring tape to resist bending so that it is necessary to manually push the measuring tape into the casing when it is desired to coil the same therein. This type of tape can be made of steel, plastic or the like, and if unrestrained, assume a substantially straight rod-like condition due to its inherent tendencies.

The principal object of this invention is to provide a controlling means in the form of a holder with a drum therein for this type of tape which will overcome the said inherent tendencies to such an extent that only the desired portion of the total length of the tape, which is manually permitted to uncoil, will assume the said straight rod-like condition, the remainder of the tape remaining quiescent in its coiled state;

Another object of this invention is the provision of a steel tape of the coilable type where friction between adjacent loops of the tape is substantially eliminated, thus avoiding wear upon the printed matter thereon;

Another object of this invention is the provision of flexible tape of the windable type wherein friction between the tape and the opening in the wall of the holder, or housing, is substantially eliminated, thus avoiding wear upon the longitudinal edges of the tape;

Still another object of this invention is the provision of a parallelepipedon type housing, or six-sided case whose faces are parallelograms, two of the opposite faces being quickly removable for assembly and removal of the drum and tape therein.

A further object of the invention is to so construct the elements of which the device is composed that they will be durable and capable of standing rough usage such as a device of this character is subjected to, and at the same time be relatively inexpensive to manufacture and assemble;

The construction and operation of the device forming the subject of the present application will be fully disclosed hereinafter, reference being had to the accompanying drawing, of which:

FIG. 1 is a sectional view taken substantually on the line 1—1 of FIG. 3;

FIG. 2 is a plan view of a preferred form of my invention with some parts broken away;

FIG. 3 is a sectional view taken on line 3—3 of FIG. 2;

FIG. 4 is a fragmentary view of one side of the rule housing showing the opening therein for receiving the rule shown by FIG. 5;

FIG. 5 is an elevational view of a modified form of my invention;

FIG. 6 is a fragmentary sectional view taken substantially on line 6—6 of FIG. 7, some parts omitted;

FIG. 7 is a vertical sectional view of the drum and associated parts mounted on its supporting shaft as shown in FIG. 1;

FIG. 8 is a fragmentary view showing means of securing the free end of the coil spring to the inner surface of the drum;

FIG. 9 is a perspective view of the tape guide means as shown by FIGURES 2 and 4;

FIG. 10 is a transverse sectional view of one form of tape used in the ruler of this invention;

FIG. 11 is a transverse sectional view of the preferred form of tape used in the ruler of this invention;

FIG. 12 is a transverse sectional view of a third form of tape used in the ruler of this invention; and FIG. 13 is an exploded view of the housing parts and the central shaft, all shown in a perspective arrangement.

A concavo-convex steel tape 20 is shown in assembled position within a case generally indicated at 22. The case is a parallelepipedon type housing and consists of a base plate 24, a top plate 25, a front plate 26, a rear plate 27, a right end plate 28 and a left end plate 29. The end plates 28 and 29 are each provided with a centrally positioned round hole, designated by numerals 30 and 31, respectively, for the reception of securing means, such as a threaded bolt 32. A cylindrical bearing shaft 33, of a length equal to the width of said front and rear plates 26 and 27 is provided, said shaft 33 having longitudinal threaded bores in each end thereof for the reception of said threaded bolts 32, said shaft when assembled extending between the end plates 28 and 29. The said end plates 28 and 29 are provided with peripheral grooves as shown by FIG. 1, said grooves receiving the end portions of the top, bottom, front and rear plates, thereby holding the same in assembled position by the locking action of said shaft 38 with said end plates 28 and 29 secured by threaded bolts 32, sometimes referred to as assembly screws 32.

The shaft 33 is provided with a longitudinal slot 40 between the ends thereof. A wind-up spring 42 is positioned around said shaft 33 with its inner end 43 rigidly fixed therein. The outer end 44 of the wind-up spring 42 is connected in a manner shown by FIG. 8 of the drawings to the interior of drum 50, to be described hereinafter.

As clearly shown by FIGURES 1 and 7, the drum 50 is composed of a cylindrical drum wall 52 and three circular discs 53, 54, and 55, said discs having centrally disposed apertures through which said shaft 33 can extend therethrough. Said disc 54 is secured by welding, or the like, to the inner surface of said drum wall 52 midway between the ends thereof. Said disc 55 is secured by welding, or the like, to the interior surface of said drum wall 52 a short distance in from one end thereof. An annular tubular shaped bearing 60 is secured by welding, or the like, to said disc 55 juxtaposed the central opening 56 therein; the bore 57 in bearing 60 is in alignment with said opening 56 and permits the insertion of shaft 33 therethrough and the rotation of the bearing. The disc 53 is similar to disc 55 but is removably secured to the interior surface of said drum wall 52 a short distance in from the opposite end thereof; an annular tubular shaped bearing 61 is secured to said disc 53 and in alignment with spring 58 in said bearing 61; this permits insertion of shaft 33 therethrough and the rotation of the said bearing 61. Said disc 53 being removably secured with said drum wall 52, the distance between said discs 53 and 54 is great enough to receive the coil spring 42 therebetween; the area between said discs 53 and 54 and bounded by wall 52 forms a spring chamber, or housing. A plurality of tabs 65 are punched inwardly from the drum wall 52, the circumferential spacing of the tabs 65 forming vertical supporting means for said disc 53.

A plurality of tabs 67 are punched inwardly from the drum wall 52, circumferentially spaced between said tabs 65 and outwardly therefrom a distance slightly greater than the thickness of said disc 53. Before insertion of disc 53 and bearing 61 upon shaft 33 during assembly, the tabs 67 are bent parallel to wall 52, the inner end 43 of spring 42 is inserted through slot 40; the outer end is secured between two finger type tabs 70 and 71, spaced upon the interior surface of the drum and at a distance apart equal to the width of said spring; later said tabs 70 and 71 are pressed into frictional engagement with said coil spring 42 to prevent accidental removal therefrom. Said disc 53 with bearing 61 is journalled upon shaft 33, arranged inside the drum wall 52 and said tabs 67, then bent inwardly of the drum, thereby securing disc 53 between the tabs 65 and 67.

The space between said drum wall 52 and the top, bottom, front and back walls of case 22, forms a tape chamber 75 wherein a tape "T" of a width substantially equal to the longitudinal length of the drum 50 is coiled. The tape "T" is a concavo-convex type tape. The top plate 25 is formed with a circular opening 74 through which the tape "T" may pass therethrough when in use. A rectangular, or square plate 82 is secured upon the inside of said top plate 25 by four rivets 77 extending through openings 78 in the corner portions thereof. Said plate 82 is provided with a C-shaped slot therein formed by projection member 83 with enlarged head 84 thereon; its use to be described later. As shown by FIGURES 1, 2 and 3, the tape "T" is completely wound into an internally wound coil; the outer convolution lies adjacent the walls of the case, and the inner convolutions lie one within the other and in contact with each other, as shown by FIG. 3. The inner end 85 of said tape "T" is provided with openings 86 and 87 formed with rectangular portions to fit over fingers 88 and 89 formed upon the exterior surface of drum wall 52, whereby said tape "T" is anchored to the drum 50. The free end of the tape "T" extends through said C-shaped slot and outside the case 22, and has a hook element 90 riveted thereto.

When the tape is in its unrestricted form, the tape assumes a transverse curvature, such as illustrated in FIGURES 10, 11 and 12, but when the tape is wound within the case 22, the cross-section of the tape is transformed from the arcuate form shown in FIGURES 10, 11 and 12 to the flat form illustrated in FIGURES 2 and 3. The wound coil of tape lies within the tape chamber 75, as shown and described above.

The preferred form of tape "T" is shown by FIGURE 11 where the tape is substantially tubular in cross-section in unrestricted form. A modified form "T-2" is shown by FIGURE 10, where the tape is semi-circular in cross-section, in unrestricted form. A further modified form of tape "T-3" is shown by FIGURE 12 where the substantially tubular tape is of greater thickness along its central portion between its longitudinal edges, said increased thickness giving increased strength to resist bending.

By FIGURES 2 and 3 the tape "T" is coiled upon its unrestricted convex surface. By FIGURES 4 and 5 the tape "T" is coiled upon its unrestricted concave surface. The tape is freely coiled by either form, whichever is mostly desired by the user. When the block 82 is assembled upon top plate 25, as shown by FIGURE 2, the enlarged head 84 of projection member 83 is remote from the rear plate 27, while by FIGURE 4, the enlarged head 84 extends in a direction toward the edge of plate 25 in contact with the edge of plate 27. The C-shaped slot in plate 82 is formed with an inwardly extending ridge 92 which keeps the tape from contacting the free edge portion of opening 74 in top plate 25. The enlarged head 84 on projecting member 83 guides the tape longitudinally between its edges and close to said ridge 92. The unrestricted tubular shape of tape "T" travels in said C-shaped slot without contacting the open walls of hole 74 in plate 25 due to the guidance of head 84 and ridge 92. Said head 84 and ridge 92 will function equally well with the tapes shown by FIGURES 11 and 12.

The inner end 85 of the tape being secured to the drum 50 and the outer end 44 of the coil spring being secured to the drum 50, while the inner end 43 of the coil spring is anchored in the non-rotating shaft 33, will prevent the tape from expanding to such an extent as to produce an undesirable degree of frictional engagement between the convolutions of the tape and any wall portions of the case 22. The resilience of the tape and the resilience of the spring are preferably so correlated as to give what is known as a push-pull type of rule; that is, a rule wherein the tape may be manually moved into and out of the casing and the rule is maintained substantially in any desired extended position.

Heretofore, in measuring devices of this sort, if the free end of the tape extended somewhat beyond the casing, it remained there, due to the balanced condition of the parts, and not infrequently the projecting end of the tape would be damaged. Considerable inconvenience has been occasioned by the usual hook, which is provided on the free end of the tape, accidentally engaging with some object and thereby causing inadvertent withdrawal, to a slight extent, and the tape remaining in that condition, or state. By this invention, the arrangement is such that the tail or free end portion of the tape is automatically drawn into the casing. Thus when the tape has been manually pushed almost to its full wound-up position, it will be automatically snapped or moved to its complete wound position. The novel projection member will guide the tape in either direction and buckling or damaging of the tape is prevented, especially when the tape is extended in rod-like form, or tubular form. The tubular extended form gives rigidity never before obtained by any tape. The change-over from the tubular form to the flat form within the case overcomes any springlike action to snap the tape away from an object when more than two inches of tape is outside the tape housing.

In the construction shown by FIG. 3, it is further observed that the flight of the tape between the point where it comes into contact with the C-shaped slot opening walls and the point at which it is tangent to the tape coil forms an angle with respect to the side of the case. Attention is directed to the fact that as the tape is withdrawn, the pull of the wind-up spring increases, but that simultaneously this last mentioned angle correspondingly increases as the tape coil grows smaller on the drum, thus giving an increased cramping action against the tape C-shaped guide elements provided therewith to counteract the increase of pull of the spring. Hence a balance between spring pull and tape slot wall friction is at all times assured. This is assured in this invention since the wind-up spring is approximately one-half the width of said tape.

It is clearly shown by FIGURE 1, by dotted lines, how the tape changes from its tubular form to the flat transverse shape within the tape housing. The flat sides of the housing permits the ruler to be arranged horizontally or vertically in use, and the tubular extended tape will remain extended in a still rod-like manner.

It is apparent that the spring can be replaced by simply removing screw 32, the side 29, and then disc 53 after bending the tabs 67 horizontally, or parallel to shaft 33.

It is apparent that the drum is substantially a rigid cylindrical element, having two rigid discs and a removable disc whereby a spring chamber is formed and allowing quick removal of the spring when necessary.

It is apparent that the side walls 28 and 29 are removably secured to a single shaft, and the entire case can be disassembled by removal of the side walls due to the grooves in the peripheral portions of said walls.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

We claim as our invention:

1. A case for a steel tape of concavo-convex type including a center post therein, a drum rotatable upon said center post and adapted to serve as a spool upon which to wind a tape, and a wind-up spring coiled about said center post and having its inner end fixed with respect thereto, and having its outer end fixed with respect to said drum, said case having a circular tape opening of predetermined cross-sectional dimensions for the passage of the tape into and out of the case, a rectangular shaped guide plate secured to said case and arranged over said circular tape opening, said guide plate having a projection and an enlarged head portion forming a C-shaped slot therethrough for the passage of the tape into and out of the case, said slot being formed with an inwardly extending ridge preventing said tape from contact with the edge portions of said tape opening in said case, said enlarged head and said extending ridge guiding the tape longitudinally, the length of said C-shaped slot being approximately equal to the length of said drum and the width of said tape which are approximately the same, whereby substantially the entire tape may be manually withdrawn from the case through said C-shaped slot and assume a tubular configuration while said slot serves to resist the inherent tendency of the coiled tape to move and flatten out from tubular form.

2. The invention according to claim 1 wherein said case is a parallelepipedon type housing with six faces which are parallelograms, the center post being secured between two opposite and parallel faces by suitable means, said two opposite parallel faces having peripheral grooves formed therein into which are affixed the edge portions of the remaining four faces, whereby the entire case can be disassembled by removing said means from said center post.

3. A measuring device comprising a case for a coiled steel tape of the concavo-convex, tubular type, the case being of cubical shape and having six sides of square configuration, one side having a circular opening therethrough, a guide plate of rectangular shape affixed over said circular opening, said plate having a "C"-shape slot through which the tape may pass as it is uncoiled, said slot having a ridge midway its ends to engage a portion of the convex side of the tape, said guide plate having a projection with an enlarged head portion to engage a portion of the concave side of the tape, a center post mounted within said case parallel with said face with said circular opening therein, a cylindrical drum mounted longitudinally and rotatably on said center post, said drum having a pair of fingers formed on its exterior surface, and a concavo-convex steel tape partially coiled upon said drum, a wind-up spring coiled upon said center post with its inner end affixed thereto and its outer end affixed to said drum to effect return rotation thereof, said steel tape having a pair of rectangular openings in its inner end and mounted with its inner end removably affixed to said drum by engaging said openings in the tape with said fingers of the drum and arranged to wind and rewind within the case and having a portion extending from the coil and through the C-shaped slot and circular opening to a point of access outside of the case, the tape coil being so positioned that one side of the tape as it passes through the slot is constrained into contact with the said ridge and the other side of the tape as it passes through the slot is constrained into contact with said enlarged portion of the guide plate, the slot surface contacts thus resulting in creating frictional resistance to free passage of the tape through the slot, the axis of the tubular uncoiled tape portion at the start of withdrawal lying at a small angle with respect to a line drawn from said slot opening tangent to the circle defined by the outer coil of the tape when fully wound on said drum and lying at a slightly greater angle with respect to a line drawn from said slot opening to the circle defined by the drum, whereby the tubular tape portion occupying at any given time said C-shaped slot and associated elements are subjected to a slight bend which is least when the tape is fully coiled within the case and becomes progressively greater as the tape is withdrawn.

References Cited in the file of this patent

UNITED STATES PATENTS

| | | |
|---|---|---|
| 2,157,278 | Blackmore | May 9, 1939 |
| 2,276,935 | Como | Mar. 17, 1942 |
| 2,410,420 | Bennett | Nov. 5, 1946 |
| 2,510,939 | Carlson | June 6, 1950 |
| 2,599,320 | Dart | June 3, 1952 |